March 4, 1969 C. R. STRUCK 3,430,652
INTERMITTENTLY OPERABLE FLUID BALLAST MECHANISM
Filed Aug. 4, 1966 Sheet 1 of 2

INVENTOR
CHARLES R. STRUCK
BY Norman Gerlach
ATT'Y

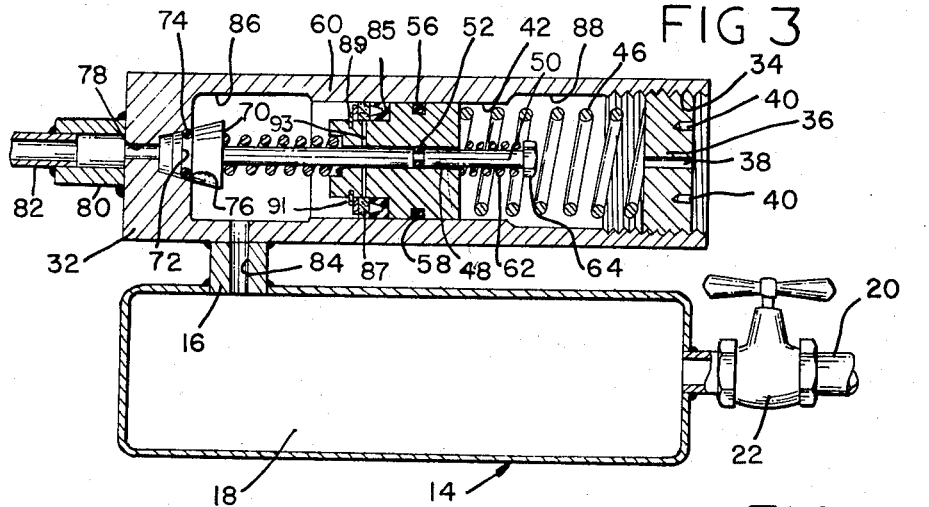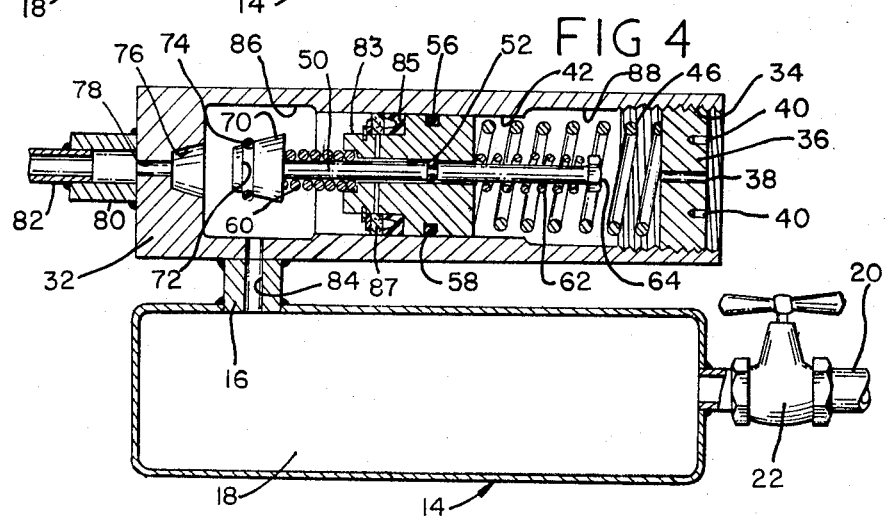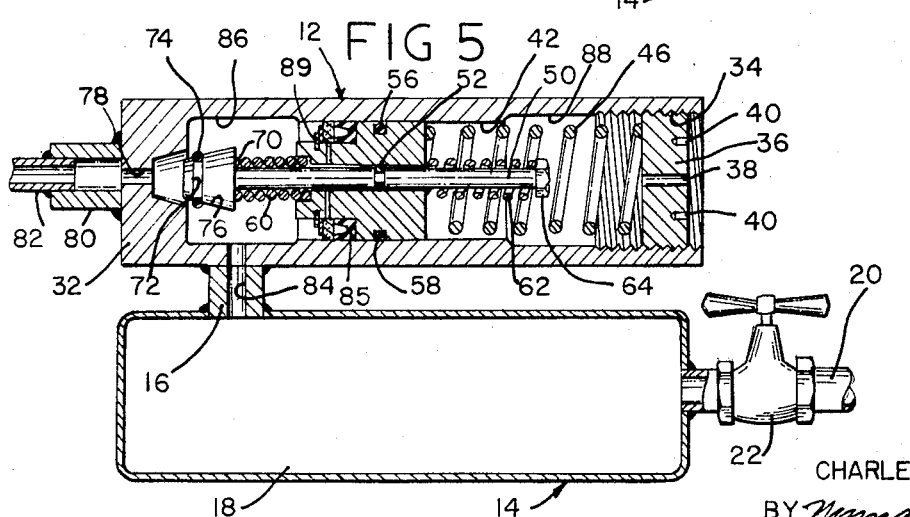

United States Patent Office 3,430,652
Patented Mar. 4, 1969

3,430,652
INTERMITTENTLY OPERABLE FLUID BALLAST MECHANISM
Charles R. Struck, Santa Barbara, Calif., assignor, by mesne assignments, to Houdaille Industries, Inc., Buffalo, N.Y., a corporation of Michigan
Filed Aug. 4, 1966, Ser. No. 570,246
U.S. Cl. 137—624.14       5 Claims
Int. Cl. F17d *3/00;* F16d *31/12, 31/00*

ABSTRACT OF THE DISCLOSURE

An intermittently operable fluid ballast mechanism including a cylinder adapted for connection to a constant flow of pressurized fluid, a valve seat forming an outlet in one end of the cylinder, a piston in the cylinder biased in the direction of the valve seat, a piston rod extending through and slidable axially within the piston, a cooperating valve member formed on the piston rod, a spring biasing the piston in the direction of the valve seat, another spring mounted on the piston rod between the valve member and the forward end face of the piston and another spring mounted on the piston rod between the rear end face of the piston and a shoulder formed on the piston rod. A buildup in fluid pressure in the cylinder moves the piston away from the valve seat but does not cause the valve member to unseat until the compressive force of the spring mounted on the piston rod between the rear end face of the piston and the shoulder overcomes a sealing force provided by the fluid on the valve member. When such force is overcome the valve member snaps to an open position, thus discharging the fluid through the outlet and causing the piston to move toward the valve seat which in turn causes a compression of the spring on the piston rod between the forward end face of the piston and the valve member to return the valve member to a seated position.

---

The present invention relates to an intermittently operable fluid ballast mechanism by means of which a measured quantity of either a liquid or a gaseous medium may be supplied at predetermined intervals and at a predetermined pressure to a fluid-actuated device to insure positive operation of the latter throughout a wide range of operating frequencies.

The invention will be found particularly useful in connection with reversible pneumatic motors of the oscillatory type, as, for example, "Trico" and similar pneumatic pressure operated motors which are commonly employed for operating the windshield wipers of automotive vehicles and are also widely used in industry as driving units for secondary equipment of the type that must be intermittently operated at varying frequencies. The invention is, however, not limited to such use and, in its broadest aspect, it contemplates the provision of a timing device or mechanism by means of which large increments of an energizing fluid may be released at predetermined intervals for the intermittent operation of a fluid motor in order to stabilize the frequency of the motor and prevent stalling of the latter at extremely low frequencies.

Where air-operated windshield wiper motors are concerned, a common source of complaint is predicated upon the inability of such motors to operate at low frequencies on the order of from eight to ten wiper strokes per minute. This is true of many expansion chamber-type motors where the power stroke of the motor is dependent upon the rate of supply of a fluid, particularly air, to an expansion chamber. While an air-operated motor is quite efficient at high frequencies, where low frequencies are concerned, there is a tendency for the motor to stall due to the fact that the slow rate of air feed to the expansion chamber is insufficient to overcome the leakage factor that is occasioned by high frictional resistance and inadequate sealing of the piston or rotary vane with the result that there is a tendency for air to bypass the piston or vane from the high pressure to the low pressure side thereof with no further enlargement of the expansion chamber.

The present invention is designed to overcome the above-noted limitation that is attendant upon the construction and operation of conventional air-operated motors of the expasion chamber type and, accordingly, there is contemplated the provision of a novel intermittently operable fluid ballast mechanism by means of which predetermined quantities of a motivating fluid such as air or hydraulic oil may be regulably supplied to an air-operated motor at a pressure that is adequate to insure full power against the motivating element of the motor, regardless of whether the same be a reciprocable piston, an oscillating vane, a diaphragm or other reversible member, each delivery of such fluid to the motor being adequate both as to its quantity and the pressure at which it is supplied in order to impel the motivating element positively from its initial to its terminal position in either direction of movement.

The provision of such a fluid ballast mechanism constitutes the principal object of the present invention and it is a further object to provide a mechanism which depends for its operation solely upon the pressure of fluid that is derived from a source thereof regardless of whether the same be above or below atmospheric pressure, and which is devoid of extraneous electrical or other control mechanisms or timing instrumentalities.

The provision of an intermittently operable fluid ballast mechanism which is extremely simple in its construction and therefore, may be manufactured at a low cost; one which is possessed of a minimum number of parts, particularly moving parts, and, therefore, is unlikely to get out of order; one which is rugged and durable and, therefore, will withstand rough usage; one which is smooth and silent, yet positive in its operation; one which is compact and occupies but little space; and one which, otherwise, is well adapted to perform the services required of it, are further desirable features which have been borne in mind in the development and production of the present invention.

Numerous other objects and advantages of the invention, not at this time enumerated, will be apparent from a consideration of the following detailed description or specification.

In the accompanying two sheets of drawings forming a part of this specification, two illustrative embodiments of the invention are shown.

In these drawings:

FIG. 3 is a sectional view similar to FIG. 2 but showing the parts of the mechanism shortly after the commencement of a fluid delivery cycle;

FIG. 4 is a sectional view similar to FIGS. 2 and 3 but showing the parts of the mechanism in the positions which they assume when full pressure accumulation of fluid has been attained and at the instant when fluid delivery at such pressure to the fluid-operated device has been initiated;

FIG. 5 is a similar sectional view but showing the parts of the mechanism in the positions which they assume near the end of the fluid delivery cycle;

Figure 1:
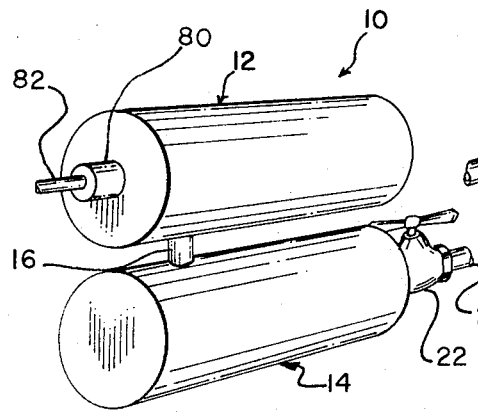
FIG. 1 is a perspective view of an intermittently operable fluid ballast mechanism embodying the principles of the present invention and constituting the preferred embodiment of the invention.
Figure 2:
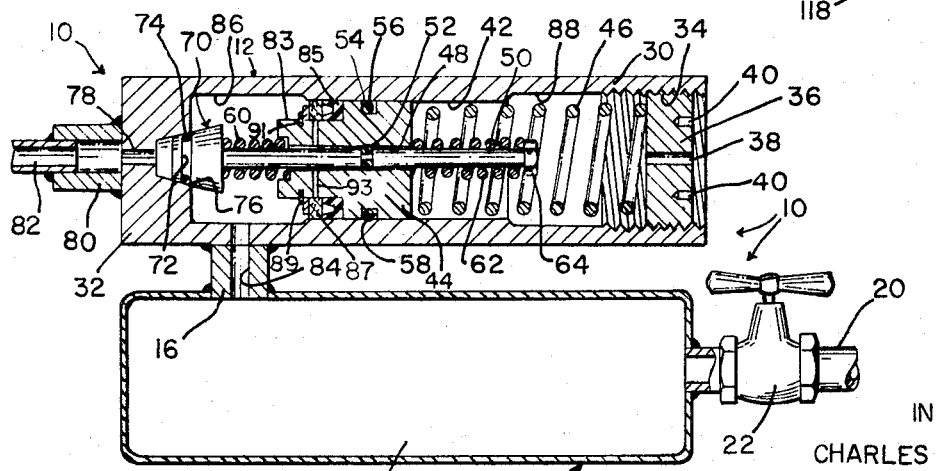
FIG. 2 is a sectional view taken substantially centrally and vertically through the fluid ballast mechanism of FIG. 1, showing the parts of the mechanism in the positions which they assume when the mechanism is in its free state and disconnected from a source of fluid under pressure, the view also being illustrative of the position of the parts at the commencement of a fluid delivery cycle.

Referring now to the drawings in detail and in particular to FIGS. 1 and 2, the intermittently operable fluid ballast mechanism of the present invention, in one form thereof and particularly designed for use in connection with the delivery of a gaseous media such as air to a remote air-operated motor (not shown) is designated in its entirety by the reference numeral 10 and involves in its general organization two cylindrical components, namely, a compound piston and cylinder assembly 12 and a surge tank 14, the two components being physically and functionally connected together by a nipple 16. The surge tank 14 affords or forms an internal surge chamber 18 and one end thereof is operatively connected by a conduit (pipe) 20 to a source of oil-lubricated air under pressure, the conduit having interposed therein a manually regulable needle valve assembly 22 of conventional construction and by means of which such lubricated air may be introduced into the surge chamber 18 at a predetermined rate of flow.

The piston and cylinder assembly 12 includes a cylinder in the form of a cylindrical housing 30, the forward end of which is closed by a relatively thick front end wall 32. The cylindrical housing 30 has an open rear rim region which is internally threaded as at 34 to receive a combined spring-retaining and bleeder plug 36 having a bleeder or venting passage 38 therein. The plug 36 is externally threaded and embodies spanner holes 40 by means of which the longitudinal position of the plug within the housing 30 may be adjusted for a purpose that will be made clear presently. The plug constitutes, in effect, a rear end closure wall for the housing. A medial region of the housing 30 is inwardly thickened as at 42 and a reciprocable piston 44 operates within such thickened medial region. A relatively massive helical compression spring 46 is disposed within the rear end portion of the interior of the housing 30 and is interposed between the piston 44 and the plug 36. The piston 44 is formed with a central axial bore 48 therethrough and a piston rod 50 projects loosely through this bore so that the piston 44 is slidable thereon. An inner O-ring 52 of elastomeric material seats within an annular groove 54 in the rod 50 and seals the annulus that exists between the piston and piston rod. A similar outer O-ring 56 seats within an annular groove 58 in the outer periphery of the piston 44 and seals the latter to the inner cylindrical surface of the thickened medial region 42 of the housing 30. A spring 60 surrounds the piston rod 50 and bears at one end against the piston 44. At its other end, the spring 60 bears against a valve member 70 which is mounted on the front end of the piston rod 50. The spring 60 limits sliding movement of the piston in a forward direction, the spring attaining a solid condition at the end of the forward stroke of the piston. Sliding movement of the piston 44 in the opposite direction is limited by a relatively light helical compression spring 62 which surrounds the rear end portion of the piston rod 50, is disposed within the spring 46, and bears at one (front) end against the piston 44 and at its other or rear end against an enlarged head 64 on the rod, the head preferably being in the form of a nut which is threadedly received on the rear end of the piston rod.

The previously mentioned valve member may be formed entirely of elastomeric material but, in the illustrated form of the invention, it is in the form of a frusto-conical body having formed therein an annular groove 72 in which there is seated a sealing ring 74, the ring being designed for cooperation with a conical valve seat 76 which is formed on the end wall 32 and is in communication with a discharge passage 78 that leads from the housing 30. The passage 78 communicates through a nipple 80 with a conduit 82 leading to the remote air-operated instrumentality (not shown) with which the present intermittently operable ballast mechanism may be associated. The piston 44 is recessed as at 83 in the rear region thereof and a resilient bellows ring 85 which is preferably formed of "Teflon" and is of U-shape in radial cross section, is seated within the recess 83. A felt or other porous lubricator washer 87 is disposed within the recess 83 rearwardly of the bellows ring 85 and is held in position by a snap ring 89 which is seated within the groove 91 in the piston 44. The felt washer is of the breather type and accumulates oil which is entrained in the air that is supplied from the surge chamber 18, the air being drawn through the washer in one direction and then forced through the washer in the other direction under the expansive and contractive influence of the bellows ring 85 during each stroke of the piston. Radial bores 93 in the piston conduct oil from the felt washer 87 to the rod 50 for lubricating purposes.

Various forms of air-operated instrumentalities are readily susceptible to intermittent control by the ballast mechanism 10 but for purposes of discussion herein, it may be assumed that the mechanism is to be employed for the controlled operation of a conventional vane-type pneumatic motor in which an oscillatory vane constitutes the movable dividing element between opposed expansion chambers and in which suitable direction control valve means is provided for alternating the flow of compressed air to the two expansion chambers. In such an instance, the conduit 82 will be operatively connected to the intake side of such control valve means and the throttle valve that is ordinarily associated with such air-operated motor will be adjusted to its wide open position which, ordinarily and in the absence of the present ballast mechanism, would result in maximum motor speed.

Assuming that the remote air-operated instrumentality, that is, the aforementioned vane-type pneumatic motor, is to be operated at a relatively low speed, for example, on the order of five cycles per minute, the threaded plug 36 will be initially adjusted to regulate the compression of the helical compression spring 46 so that the piston 44 will balance the desired minimum pressure at the remote air-operated instrumentality and thus maintain the piston 44 seated against the collar 60 on the piston rod 50, while at the same time maintaining the frusto-conical valve member 70 against the valve seat 76. This position of the parts of the intermittently operable fluid ballast mechanism 10 is illustrated in FIG. 2.

To set said mechanism 10 into operation, the needle valve 22 is adjusted to admit air to the interior of the surge tank 14 at a predetermined rate commensurate with the desired speed of operation of the remote air-operated instrumentality and such adjustment of the needle valve 22 will cause the internal surge chamber 18 to become filled slowly with air under pressure. As pressure builds up in the surge chamber 18, it is transmitted through a passage 84 in the nipple 16 to the pressure chamber 86 which is established within the housing 30 on the forward or front side of the piston 44. The increasingly mounting pressure in the chamber 86 thus acts against the forward side of the piston 44 and causes the same to move rearwardly within the housing 30, thus gradually compressing the spring 46. Air within a bleeder chamber 88, which is established within the housing 30 on the rear side of the piston 44, escapes to the atmosphere through the venting passage 38. Due to the effective cross sectional area of the valve seat 76 and the pressure of air acting upon the valve member 70, the latter will remain seated during the initial rearward movement of the piston. Such rearward movement of the piston 44 causes compression of the inner helical compression spring 62 between the rear side of the piston and the enlarged head or nut 64. Such spring thus exerts an increasingly greater axial thrust upon the piston rod 50 in a rearward direction as the pressure of air within the surge chamber 18 and the pressure chamber 86 gradually builds up. At a predetermined point in the cycle of operation of the mechanism 10, this rearward axial thrust upon the piston rod 50 will exceed the pneumatic forces acting upon the valve member 70 and at such time the seal existing between the sealing ring 74 and the valve seat 76 will be broken and, at such time, the pressure of air on opposite ends of the valve member 70 will be equalized as illustrated in FIG. 3 so that the spring 62 may then force the piston rod 50 rearwardly to the position wherein it is shown in FIG. 4 and wherein the collar 60 engages the forward side of the piston 50.

The valve seat 76 thus being uncovered, and the discharge passage 78 now being in communication with the relatively high pressure air within the pressure chamber 86, air will be discharged through the passage 78 and the conduit 82 to the remote air-operated motor or other instrumentality. As air is thus conducted from the pressure chamber 86 to the remote air-operated instrumentality, the valve member 70 is maintained out of contact with the valve seat 76 by means of the spring 62 which maintains the piston rod 50 retracted with respect to the piston 44. However, the decrease in pressure within the pressure chamber 86 incident to the discharge of air therefrom will relieve the pressure acting on the forward side of the piston 44 and the spring 46 will force the piston 44 and the rod 50 bodily forwardly as illustrated in FIG. 5 until such time as the valve member is again forced against the valve seat 76 by the thrust that is exerted thereon through the piston rod 50, the collar 60, and the piston 44. At this time, the discharge cycle is complete and the parts of the mechanism 10 assume the position in which they are shown in FIG. 2 preparatory to a repetition of the cycle.

From the above description, it will be apparent that the duration of each discharge cycle may be varied by regulating the rate of introduction of air into the surge chamber 18 under the control of the needle valve 22, the smaller the orifice established by this valve, the longer the discharge cycle. It will be understood, of course, that other factors may be varied to attain different discharge cycle durations with consequent variations in the frequency of operation of the remote air-operated motor or other instrumentality undergoing control. Among these factors are the capacity of the surge chamber 18, the size of the discharge passage 78 and the relative spring rates that are involved in connection with the springs 46 and 62.

Figure 6:
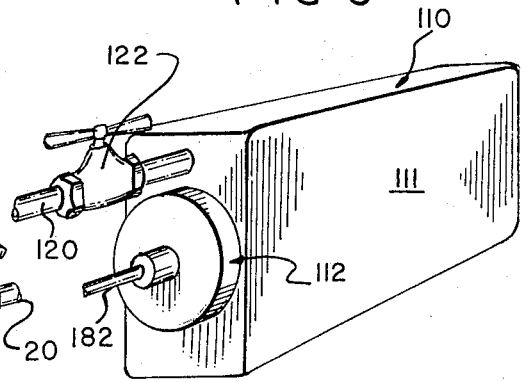
FIG. 6 is a perspective view similar to FIG. 1 but showing a modified form of fluid ballast mechanism embodying the present invention.
Figure 7:
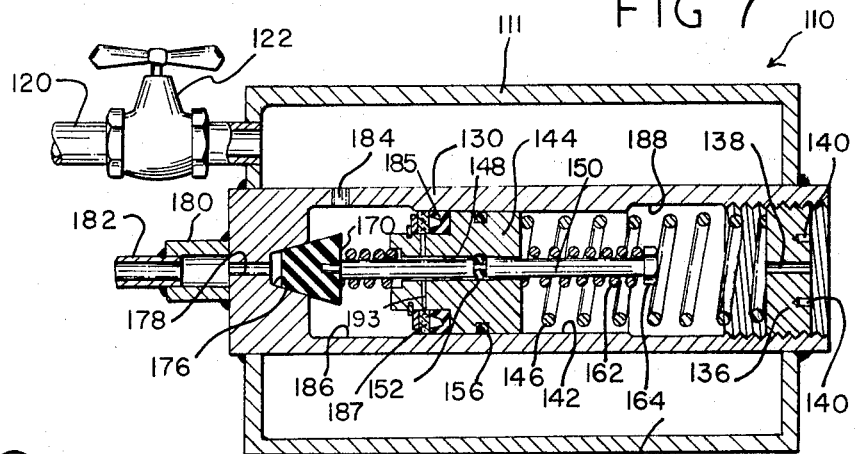
FIG. 7 is a sectional view taken substantially centrally and vertically through the fluid ballast mechanism of FIG. 6.

In FIGS. 6 and 7, there is illustrated a modified form of intermittently operable ballast mechanism 110. In this form of the invention, an integral or composite housing assembly 111 embodies both the piston and cylinder assembly 112 as well as the surge tank 114. Essentially, however, the operation of the mechanism 110 remains substantially the same as the operation of the mechanism 10. Due to the similarity of construction between the two illustrated forms of the invention, and in order to avoid needless repetition of description, corresponding reference numerals but of a higher order are applied to the corresponding parts as between the structures of FIGS. 1 and 2, and of FIGS. 6 and 7, respectively, insofar as is practicable.

In the form of the invention shown in FIGS. 6 and 7, the surge chamber 118 surrounds the piston and cylinder assembly 112 and is in communication with the pressure chamber 186 through a small passage 184 which corresponds to the passage 84 in the nipple 16. The piston and cylinder assembly 112, however, is not changed and it embodies all of the essential elements of the piston and cylinder assembly 12.

As previously stated, the intermittently operable ballast mechanisms 10 and 110 have been designed for use primarily in connection with the supplying of measured quantities of air or other fluid under pressure to a remote fluid-operated motor, or other instrumentality. For hydraulic operation in supplying liquid under pressure to an hydraulic motor or other mechanism, obviously the surge chamber 18 may be eliminated and the source of hydraulic fluid or liquid under pressure may be operatively applied directly to the passage 84 of the piston and cylinder assembly 12 of the form of the invention shown in FIGS. 1 to 5, inclusive. In such an instance, the needle valve 22 will be interposed directly in the hydraulic fluid supply line.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claims is the same to be limited.

Having thus described the invention what I claim as new and desire to secure by Letters Patent is:

1. A fluid ballast mechanism for supplying measured quantities of a motive fluid under pressure to a remote fluid-actuated instrumentality, said mechanism comprising a cylinder having front and rear end walls, there being a discharge passage providing a valve seat in said front wall for connection to said remote fluid-actuated instrumentality, a piston reciprocable in said cylinder and dividing the interior thereof into a pressure chamber in communication with said passage and a bleeder chamber, a piston rod extending axially through and slidable in said piston and movable relatively to the latter between a projected and a retracted position, the front end of the rod projecting into said pressure chamber and the back end of the rod having a shoulder formed thereon, a valve member on the front end of the rod for seating engagement with said valve seat, spring biasing means yieldingly urging the piston forwardly in the cylinder and comprising a first coil spring wound around the piston rod and continuously bottomed at one end on said valve member and at the other end on the forward end face of said piston and a second coil spring wound around the piston rod and continuously bottomed at one end on said shoulder and at the other end on the rear end face of the piston, a third spring yieldingly urging said piston forwardly in the cylinder, said cylinder being provided with a fluid inlet passage in communication with the pressure chamber for admitting fluid under pressure to the latter, said third spring normally being effective incident to the thrust exerted thereby through the piston and rod to maintain said valve member seated, said valve member also being self-biasing under the influence of a predetermined degree of pressure in the pressure chamber to maintain the same seated, means for regulably admitting fluid under pressure to said pressure chamber through said fluid inlet passage to drive the piston rearwardly in the cylinder against the action of said spring and also against the action of said spring biasing means to thereby, in effect, cause progressive projection of the piston rod with respect to the piston, said spring biasing means serving, when the piston has thus been driven rearwardly throughout a predetermined distance to counterbalance the self-biasing action of the valve member whereby the latter will be projected from the valve seat and the piston rod will be restored to its retracted position while air within the pressure chamber will be expelled from the latter through said discharge passage under the influence of the driving force of the piston as motivated by said third spring.

2. A fluid ballast mechanism as set forth in claim 1 and wherein said rear end wall comprises a plug threadedly received in the rear end region of the cylinder for axial adjustment relative to the cylinder, and said third spring bears at one end against the rear end face of the piston and at its other end against said plug.

3. A fluid ballast mechanism as set forth in claim 2 and wherein the shoulder on the piston rod against which said second coil spring bears is afforded by means of a nut threadedly received on the rear end of the piston rod.

4. A fluid ballast mechanism as set forth in claim 1 and wherein said means for regulably admitting fluid under pressure to the pressure chamber comprises a surge tank establishing an internal surge chamber in communication with said pressure chamber, and adjustable valve means for supplying fluid under pressure to the surge tank.

5. A fluid ballast mechanism as set forth in claim 4 and wherein said surge tank encompasses said cylinder and, in combination therewith, establishes an annulus which comprises said surge chamber, there being a port in the wall of said cylinder establishing communication between the pressure chamber and the surge chamber.

References Cited

UNITED STATES PATENTS

| | | | |
|---|---|---|---|
| Re. 14,198 | 10/1916 | Brooks | 137—624.14 |
| 1,218,567 | 3/1917 | Kellan | 137—624.14 |
| 1,796,941 | 3/1931 | Pottenger | 137—624.14 |
| 2,804,055 | 8/1957 | Hill | 91—346 X |
| 3,216,328 | 11/1965 | Peterson | 137—624.14 X |
| 3,236,256 | 2/1966 | Valentine | 137—509 |
| 3,345,915 | 10/1967 | Dotto | 137—624.14 X |

ALAN COHAN, *Primary Examiner.*

U.S. Cl. X.R.

251—75; 137—509